(12) United States Patent
Lin

(10) Patent No.: US 10,197,767 B2
(45) Date of Patent: Feb. 5, 2019

(54) FIVE-PIECE WIDE-ANGLE LENS MODULE

(71) Applicant: Kinko-Optical Co., Ltd., Taichung (TW)

(72) Inventor: Yi-Chih Lin, Taichung (TW)

(73) Assignee: KINKO-OPTICAL CO., LTD, Taichung (TW)

( * ) Notice: Subject to any disclaimer, the term of this patent is extended or adjusted under 35 U.S.C. 154(b) by 341 days.

(21) Appl. No.: 15/242,948

(22) Filed: Aug. 22, 2016

(65) Prior Publication Data

US 2018/0052302 A1    Feb. 22, 2018

(51) Int. Cl.
| | |
|---|---|
| G02B 9/60 | (2006.01) |
| G02B 13/00 | (2006.01) |
| G02B 1/04 | (2006.01) |
| G02B 27/00 | (2006.01) |
| G02B 13/06 | (2006.01) |
| G02B 13/18 | (2006.01) |

(52) U.S. Cl.
CPC ............... G02B 9/60 (2013.01); G02B 1/041 (2013.01); G02B 13/0045 (2013.01); G02B 13/06 (2013.01); G02B 13/18 (2013.01); G02B 27/005 (2013.01)

(58) Field of Classification Search
CPC ..... G02B 9/60; G02B 13/0045; G02B 13/005
USPC .......................... 359/659, 714, 746, 753, 770
See application file for complete search history.

(56) References Cited

U.S. PATENT DOCUMENTS

| | | | |
|---|---|---|---|
| 2003/0174410 A1* | 9/2003 | Noda ..................... | G02B 13/04 359/680 |
| 2008/0144193 A1* | 6/2008 | Adachi .................... | G02B 9/60 359/770 |
| 2012/0229918 A1* | 9/2012 | Chen .................. | G02B 13/0045 359/715 |
| 2012/0307382 A1* | 12/2012 | Hsu .......................... | G02B 9/60 359/770 |
| 2013/0010375 A1* | 1/2013 | Chen ..................... | G02B 13/18 359/715 |
| 2016/0124183 A1* | 5/2016 | Hsu .......................... | G02B 9/60 359/714 |
| 2017/0153415 A1* | 6/2017 | Lai ........................... | G02B 9/60 |

* cited by examiner

Primary Examiner — Darryl J Collins
(74) Attorney, Agent, or Firm — Muncy, Geissler, Olds & Lowe, P.C.

(57) ABSTRACT

A five-piece wide-angle lens module includes, from an object side to an image side, a first lens, a second lens, a third lens, a fourth lens and a fifth lens. The first lens has negative power, a convex surface on the object side and a concave surface on the image side. The second lens, the third lens and the fifth lens all have positive power and two convex surfaces on both sides. The fourth lens has negative power and two concave surfaces on both sides. The five-piece wide-angle lens module further satisfies the following relationship: $30 \geq (T5+T7+T9)/(T6+T8+T10) \geq 10$. Thereby, the incident light can have smaller refraction angle when transmitting through the lenses, and thus the five-piece wide-angle lens module can be provided with characteristics of low manufacturing sensitivity, wide angle, low distortion, high photosensitivity efficiency and high image quality.

14 Claims, 9 Drawing Sheets

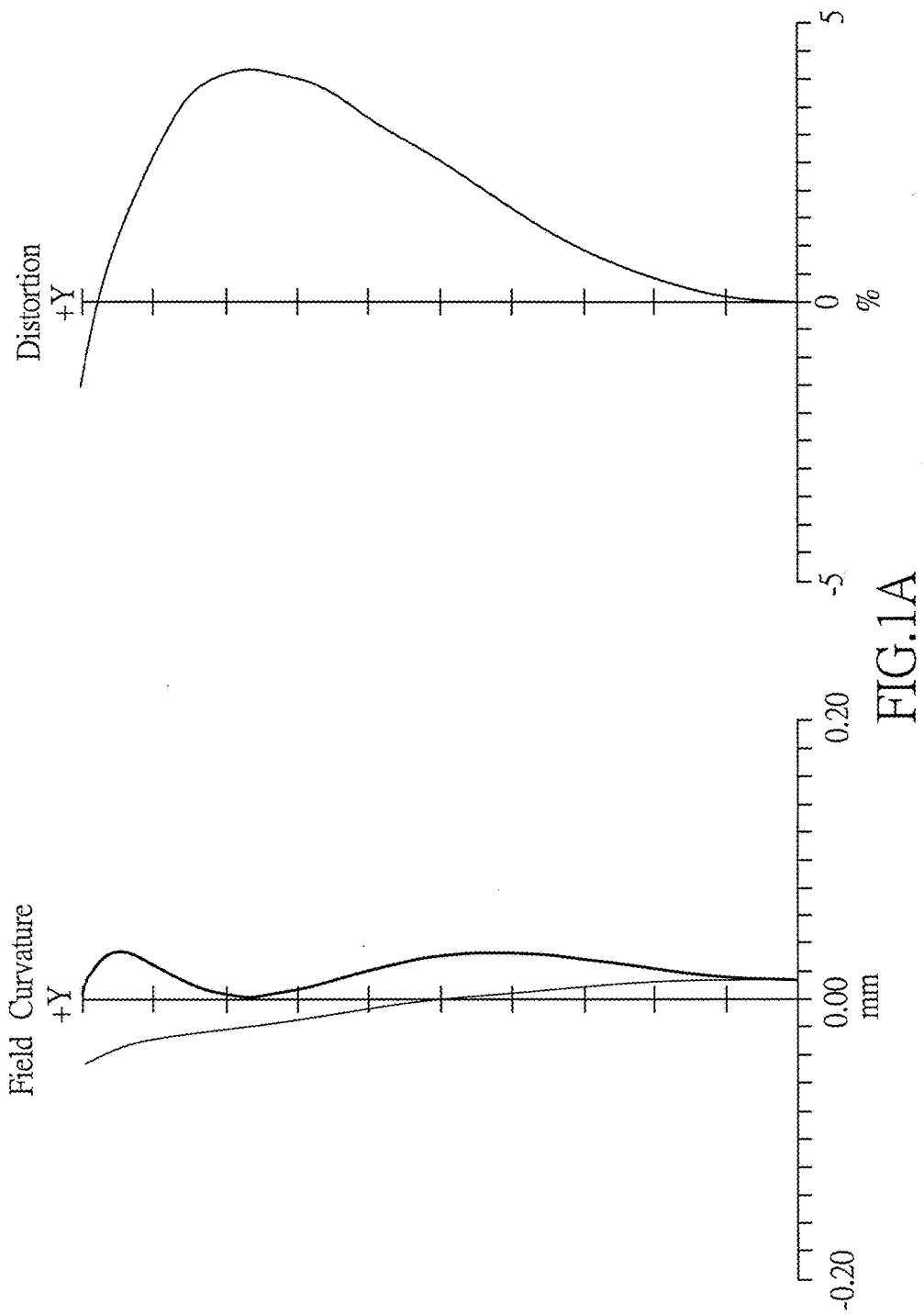

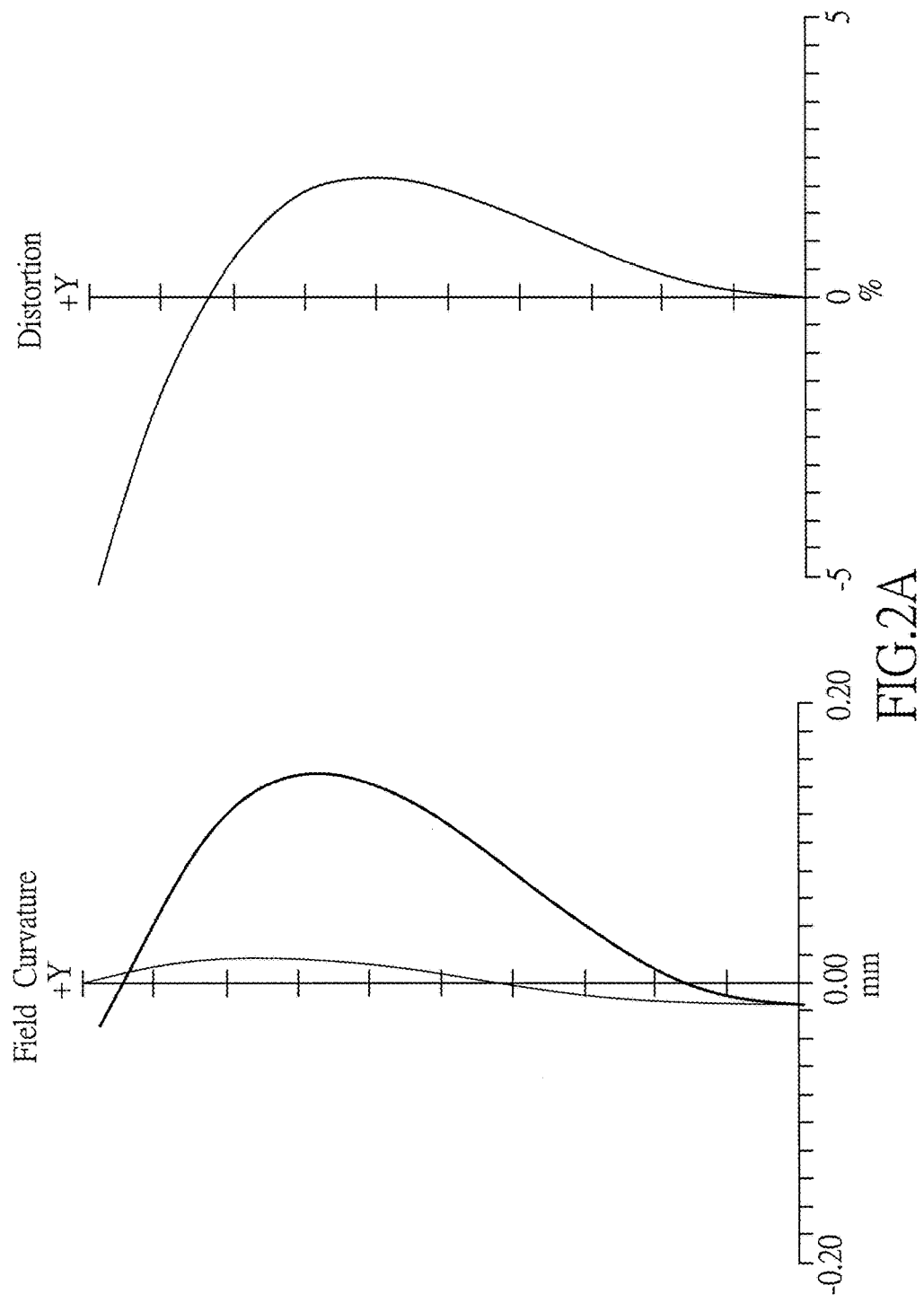

FIVE-PIECE WIDE-ANGLE LENS MODULE

BACKGROUND OF THE INVENTION

1. Field of the Invention

The present invention relates generally to an optical system, and more particularly to a five-piece imaging lens module having wide-angle characteristic.

2. Description of the Related Art

Surveillance cameras are commonly seen in household and working areas to detect any events taking place in these areas. Surveillance cameras are normally provided with wide-angle characteristic. Thus it is of concern for those skilled in this art to include the characteristics of low distortion and high imaging quality into the wide-angle surveillance cameras.

SUMMARY OF THE INVENTION

It is a main objective of the present invention to provide a five-piece imaging lens module having the characteristics of wide-angle, low distortion and high imaging quality.

To achieve the above and other objectives of the present invention, the present invention provides a five-piece wide-angle lens module. The five-piece wide-angle lens module includes, in a sequence from an object side to an image side, a first lens, a second lens, a third lens, a fourth lens and a fifth lens. The first lens has negative refraction power, a convex surface on the object side and a concave surface on the image side. The second lens, the third lens and the fifth lens all have positive refraction power, and each of them has two convex surfaces on both sides. The fourth lens has negative refraction power and two concave surfaces on both sides. The five-piece wide-angle lens module further satisfies the following relationship: $30 \geq (T5+T7+T9)/(T6+T8+T10) \geq 10$; in which T5 refers to a thickness of the third lens on an optical axis of the five-piece wide-angle lens module, T7 refers to a thickness of the fourth lens on the optical axis, T9 refers to a thickness of the fifth lens on the optical axis, T6 refers to a distance between the third lens and the fourth lens on the optical axis, T8 refers to a distance between the fourth lens and the fifth lens on the optical axis, and T10 refers to a distance between the fifth lens and an element behind the fifth lens on the optical axis. Thereby, the incident light can have smaller refraction angle when transmitting through the lenses, and thus the five-piece wide-angle lens module can be provided with characteristics of low manufacturing sensitivity, wide angle, low distortion, high photosensitivity efficiency and high imaging quality. In the present description, "an element behind the fifth lens" refers to an element between the fifth lens and the image side, e.g. a plate glass such as an optical filter or a protection glass. On the circumstance that there is no other element located between the fifth lens and the image side, "an element behind the fifth lens" refers to an image sensor disposed at the image side. Preferably, the five-piece wide-angle lens module can further satisfy the relationship of: $20 \geq (T5+T7+T9)/(T6+T8+T10) \geq 10$.

To achieve the above and other objectives, the present invention further provides a five-piece wide-angle lens module. The five-piece wide-angle lens module includes, in a sequence from an object side to an image side, a first lens, a second lens, a third lens, a fourth lens and a fifth lens. The first lens has negative refraction power, an object-sided surface and an image-sided surface. A radius of curvature of the object-sided surface of the first lens is a positive value. The radius of curvature of the object-sided surface of the first lens is larger than that of the image-sided surface of the first lens. The second lens has positive refraction power, an object-sided surface and an image-sided surface. A radius of curvature of the object-sided surface of the second lens is a positive value. The radius of curvature of the object-sided surface of the second lens is larger than that of the image-sided surface of the second lens. The third lens has positive refraction power, an object-sided surface and an image-sided surface. A radius of curvature of the image-sided surface of the third lens is a negative value. A radius of curvature of the object-sided surface of the third lens is larger than that of the image-sided surface of the third lens. The fourth lens has negative refraction power, an object-sided surface and an image-sided surface. A radius of curvature of the image-sided surface of the fourth lens is a positive value. A radius of curvature of the object-sided surface of the fourth lens is smaller than that of the image-sided surface of the fourth lens. The fifth lens has positive refraction power, an object-sided surface and an image-sided surface. A radius of curvature of the image-sided surface of the fifth lens is a negative value. A radius of curvature of the object-sided surface of the fifth lens is larger than that of the image-sided surface of the fifth lens. The five-piece wide-angle lens module further satisfies the following relationship: $30 \geq (T5+T7+T9)/(T6+T8+T10) \geq 10$; in which T5 refers to a thickness of the third lens on an optical axis of the five-piece wide-angle lens module, T7 refers to a thickness of the fourth lens on the optical axis, T9 refers to a thickness of the fifth lens on the optical axis, T6 refers to a distance between the third lens and the fourth lens on the optical axis, T8 refers to a distance between the fourth lens and the fifth lens on the optical axis, and T10 refers to a distance between the fifth lens and an element behind the fifth lens on the optical axis. Thereby, the incident light can have smaller refraction angle when transmitting through the lenses, and thus the five-piece wide-angle lens module can be provided with characteristics of low manufacturing sensitivity, wide angle, low distortion, high photosensitivity efficiency and high imaging quality. Preferably, the five-piece wide-angle lens module can further satisfy the relationship of:
$20 \geq (T5+T7+T9)/(T6+T8+T10) \geq 10$.

The above-mentioned five-piece wide-angle lens module may further include a stop located between the second lens and the third lens to balance the refraction power arrangement thereof.

The above-mentioned five-piece wide-angle lens module may further satisfy the relationship of:
$0 > R1/R10 \geq -15$; in which R1 refers to a radius of curvature of the object-sided surface of the first lens, R10 refers to a radius of curvature of the image-sided surface of the fifth lens. Thereby, the incident angle of incident light can be controlled even at wide viewing angles, so that the five-piece wide-angle lens module can have higher photosensitivity efficiency.

The above-mentioned five-piece wide-angle lens module may further satisfy the relationship of:
$8 \geq |(R5/R6)+(R7/R8)+(R9/R10)| \geq 7$; in which R5 refers to a radius of curvature of the object-sided surface of the third lens, R6 refers to a radius of curvature of the image-sided surface of the third lens, R7 refers to a radius of curvature of the object-sided surface of the fourth lens, R8 refers to a radius of curvature of the image-sided surface of the fourth lens, R9 refers to a radius of curvature of the object-sided surface of the fifth lens, R10 refers to a radius of curvature of the image-sided surface of the fifth lens. By means of the arrangement of the radii of curvature of the third lens, the fourth lens and the fifth lens, the system aberration can be effectively modified so as to achieve better imaging quality.

The above-mentioned five-piece wide-angle lens module may further satisfy the relationship of:

1<(T1+T3)/F<2.5; in which T1 refers to a thickness of the first lens on the optical axis, T3 refers to a thickness of the second lens on the optical axis, F refers to a focal length of the five-piece wide-angle lens module. Thereby, the objective of miniaturization can be achieved even at wide viewing angles.

The above-mentioned five-piece wide-angle lens module may further satisfy the relationship of:

1.5<(T2+T4)/F<2.5; in which T2 refers to a distance between the first lens and the second lens on the optical axis, T4 refers to a distance between the second lens and the third lens on the optical axis. Thereby, the system sensitivity can be effectively mitigated.

The above-mentioned five-piece wide-angle lens module may further satisfy the relationship of:

2.2<(T5+T7+T9)/F<5. Thereby, the manufacturing sensitivity can be ensured. If (T5+T7+T9)/F exceeds the upper limit, the manufacturing cost may increase. On the other hand, if the ratio is lower than the lower limit, it would become difficult to form the lenses. Preferably, the five-piece wide-angle lens module may further satisfy the relationship of: 2.2<(T5+T7+T9)/F<3.

The above-mentioned five-piece lens module may further satisfy the relationship of:

0<(T6+T8+T10)/F<0.25. Thereby, the effect similar to a compound lens, i.e. the mitigation of aberration and the increase of the resolution quality, can be achieved even without actually forming a compound lens. Preferably, the five-piece wide-angle lens module may further satisfy the relationship of: 0.1<(T6+T8+T10)/F<0.2.

The above-mentioned five-piece wide-angle lens module may further satisfy the relationship of:

0.83<(T1+T3)/(T2+T4)<1.5. Thereby, the system sensitivity of the wide-angle lens module can be mitigated.

In the above-mentioned five-piece wide-angle lens module, the first lens to the fifth lens can all be made of plastic and have two aspheric surfaces on both sides. All the lenses are not a compound lens. The manufacturing cost can thus be reduced.

The above-mentioned five-piece wide-angle lens module may further satisfy the following relationships:

2.8<R1/F<15; 0.6<R2/F<0.8; 4.2<R3/F<5.4; −4.3<R4/F<−3.7; 2.1<R5/F<2.7; −1<R6/F<−0.9; −1.3<R7/F<−1; 2.2<R8/F<2.9; 2.7<R9/F<3.1; −1.3<R10/F<−1.1; −0.7<F/F1<−0.6; 0.2<F/F2<0.3; 0.7<F/F3<0.8; −1<F/F4<−0.7; 0.5<F/F5<0.6; 7.3<TTL/F<7.7; 2.5<ALT/Gaa<2.6; in which R2 is a radius curvature of the image-sided surface of the first lens, R3 is a radius of curvature of the object-sided surface of the second lens, R4 is a radius of curvature of the image-sided surface of the second lens, F1 is a focal length of the first lens, F2 is a focal length of the second lens, F3 is a focal length of the third lens, F4 is a focal length of the fourth lens, F5 is a focal length of the fifth lens, ALT is the sum of the thicknesses of the first lens to the fifth lens on the optical axis, Gaa is the sum of the length of gaps between every two adjacent lenses among the first to fifth lenses on the optical axis, and TTL is a length of the five-piece wide-angle lens module on the optical axis. Thereby, the five-piece wide-angle lens module can be provided with characteristics of low manufacturing sensitivity, wide angle, low distortion, high photosensitivity efficiency and high imaging quality.

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

FIG. 1A is a diagram showing the field curvature and the distortion of the lens module in accordance with the first embodiment of the present invention;

FIG. 2A is a diagram showing the field curvature and the distortion of the lens module in accordance with the second embodiment of the present invention;

DETAILED DESCRIPTION OF THE INVENTION

Figure 1:
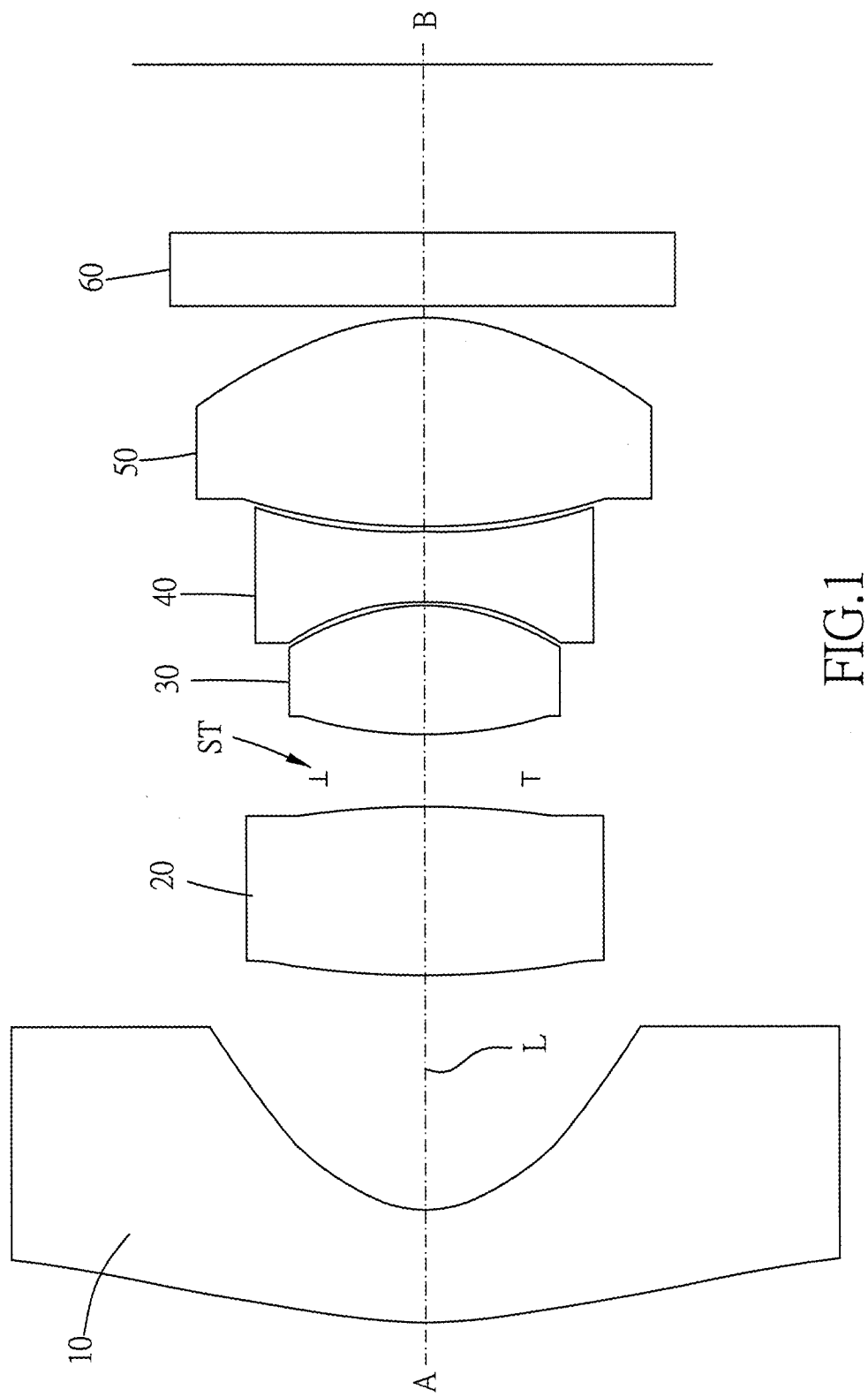
FIG. 1 is a schematic view of a lens module in accordance with the first embodiment of the present invention.

Please refer to FIG. 1 for a five-piece wide-angle lens module, hereinafter referred to as the lens module, in accordance with the first embodiment of the present invention. The lens module includes in a sequence from an object side A to an image side B on an optical axis L of: a first lens 10, a second lens 20, a stop ST, a third lens 30, a fourth lens 40 and a fifth lens 50. CCD, CMOS or other image sensor can be disposed at the image side B. One or more plate glasses 60 such as an optical filter and/or a protection glass can be optionally disposed between the image sensor and the fifth lens 50, in which the amount of the plate glass 60 can be adjusted subject to the requirements.

In the present embodiment, the first lens 10 has negative refraction power, a convex surface on the object side and a concave surface on the image side. A radius of curvature of the object-sided surface of the first lens 10 is a positive value and is larger than that of the image-sided surface thereof. The first lens 10 can be made of plastic and have two aspheric surfaces on both sides. In the present description, the radius of curvature is positive when the surface itself is closer to the object side than the curvature center of the surface; on the contrary, the radius of curvature is negative when the surface itself is closer to the image side than the curvature center of the surface.

The second lens 20 has positive refraction power, a convex surface on the object side and another convex surface on the image side. A radius of curvature of the object-sided surface of the second lens 20 is a positive value and is larger than that of the image-sided surface thereof. The second lens 20 can be made of plastic and have two aspheric surfaces on both sides.

The third lens 30 has positive refraction power, a convex surface on the object side and another convex surface on the image side. A radius of curvature of the object-sided surface of the third lens 30 is larger than that of the image-sided surface thereof. The radius of curvature of the image-sided surface of the third lens 30 is a negative value. The third lens 30 can be made of plastic and have two aspheric surfaces on both sides. The stop ST disposed between the second lens 20 and the third lens 30 is adapted to balance the arrangement of the refraction power of the system.

The fourth lens 40 has negative refraction power and two concave surfaces on both the object side and the image side. A radius of curvature of the object-sided surface of the fourth lens 40 is smaller than that of the image-sided surface thereof. The radius of curvature of the image-sided surface of the fourth lens 40 is a positive value. The fourth lens 40 can be made of plastic and have two aspheric surfaces on both sides.

The fifth lens 50 has positive refraction power and two convex surfaces on both the object side and the image side. A radius of curvature of the object-sided surface of the fifth lens 50 is larger than that of the image-sided surface thereof. The radius of curvature of the image-sided surface of the fifth lens 50 is a negative value. The fifth lens 50 can be made of plastic and have two aspheric surfaces on both sides. The arrangement of the first lens 10 and the fifth lens 50 contributes to the characteristics of wide-angle and low distortion of the lens module.

The optical feature data of the lens module in accordance with the first embodiment are listed in Table 1:

TABLE 1

| Lens | Surface | Radius (mm) | Thickness (mm) | Nd | Vd |
|---|---|---|---|---|---|
| First lens | Object surface 1 | 6.765 | 1.398 | 1.5346 | 56.07 |
|  | Image surface 2 | 1.308 | 2.916 |  |  |
| Second lens | Object surface 3 | 10.51 | 2.053 | 1.64 | 23.53 |
|  | Image surface 4 | −7.635 | 0.35 |  |  |
| Stop |  | ∞ | 0.581 |  |  |
| Third lens | Object surface 6 | 5.471 | 1.604 | 1.5346 | 56.07 |
|  | Image surface 7 | −1.843 | 0.03 |  |  |
| Fourth lens | Object surface 8 | −2.581 | 0.862 | 1.64 | 23.53 |
|  | Image surface 9 | 4.617 | 0.077 |  |  |
| Fifth lens | Object surface 10 | 5.836 | 2.587 | 1.5346 | 56.07 |
|  | Image surface 11 | −2.461 | 0.161 |  |  |
| Plate glass | Object surface 12 | ∞ | 0.9 |  |  |
|  | Image surface 13 | ∞ | 2.0793 |  |  |

All the object-sided surfaces and the image-sided surfaces of the first lens 10, the second lens 20, the third lens 30, the fourth lens 40 and the fifth lens 50 are aspheric, whose shapes satisfy the following aspheric formula:

$$z = \frac{ch^2}{1+[1-(k+1)c^2h^2]^{\frac{1}{2}}} + Bh^4 + Ch^6 + Dh^8 + Eh^{10} + Fh^{12} + Gh^{14} + Hh^{16}$$

wherein z is a value of a reference position with respect to a vertex of the surface along an optical axis of the lens module at a position with a height h, c is a reciprocal of a radius of curvature of the surface, k is a conic constant, B is a coefficient of fourth level aspheric surface, C is a coefficient of sixth level aspheric surface, D is a coefficient of eighth level aspheric surface, E is a coefficient of tenth level aspheric surface, F is a coefficient of twelfth level aspheric surface, G is a coefficient of fourteenth level aspheric surface, and H is a coefficient of sixteenth level aspheric surface.

The coefficients of the aspheric surface in the present embodiment are listed in Table 2:

TABLE 2

|  | Object surface 1 | Image surface 2 | Object surface 3 | Image surface 4 | Object surface 6 |
|---|---|---|---|---|---|
| k | −1.0850E+01 | −8.6300E−01 | 6.4000E−01 | 1.8850E+01 | −2.3780E+01 |
| B | 1.0639E−04 | 1.9315E−03 | 8.8772E−04 | 1.0295E−02 | 3.0080E−02 |
| C | −1.9737E−05 | 7.9922E−04 | −1.1048E−03 | 7.7300E−04 | −2.4178E−03 |
| D | −3.9504E−07 | −1.4343E−04 | 2.1957E−04 | 2.0135E−04 | −1.7021E−04 |
| E | 2.5289E−08 | 2.7250E−05 | 1.5980E−05 | 3.8582E−05 | −1.9897E−04 |
| F | −4.2549E−10 | −1.1188E−05 | −1.1390E−05 | 4.9910E−05 | 2.3384E−05 |
| G | 0 | 0 | 0 | 0 | 1.6856E−04 |
| H | 0 | 0 | 0 | 0 | −5.4298E−05 |

|  | Image surface 7 | Object surface 8 | Image surface 9 | Object surface 10 | Image surface 11 |
|---|---|---|---|---|---|
| k | −4.5000E−01 | 7.2000E−02 | −3.6500 | −1.0600E+01 | −2.6000E−01 |
| B | 1.7428E−02 | −2.3413E−02 | −9.9714E−03 | 3.8221E−03 | 9.6317E−03 |
| C | −2.0013E−03 | 1.3107E−03 | 2.6514E−03 | 2.5744E−04 | 2.9538E−04 |
| D | 1.2540E−03 | 5.0793E−04 | 2.3388E−05 | −6.4869E−05 | 1.6848E−04 |
| E | −1.4983E−05 | 2.4683E−05 | 1.0957E−06 | 1.0714E−05 | 1.7548E−06 |
| F | −8.2856E−05 | 1.8063E−04 | 1.0784E−06 | −9.4097E−07 | −1.1622E−06 |
| G | 2.7980E−05 | 6.1848E−05 | 4.0658E−07 | 1.2885E−07 | −1.6027E−07 |
| H | 4.4755E−05 | 5.5024E−06 | 6.0066E−09 | −2.5708E−07 | −1.1481E−08 |

Based on the afore-mentioned design, the total focal length F of the present embodiment is 2.043 mm, the total length thereof is 15.6 mm, the focal length of the first lens is −3.318 mm, the focal length of the second lens is 7.179 mm, the focal length of the third lens is 2.781 mm, the focal length of the fourth lens is −2.453 mm, the focal length of the fifth lens is 3.619 mm, the maximum viewing angle is 110 degrees.

As such, the value of the above-mentioned relationships of the lens module are listed in Table 3:

TABLE 3

| Relationship | Value |
|---|---|
| R1/R10 | −2.75 |
| (T5 + T7 + T9)/(T6 + T8 + T10) | 18.85 |
| \|(R5/R6) + (R7/R8) + (R9/R10)\| | 7.13 |
| (T1 + T3)/F | 1.69 |
| (T2 + T4)/F | 1.88 |
| (T1 + T3)/(T2 + T4) | 0.90 |
| (T5 + T7 + T9)/F | 2.47 |
| (T6 + T8 + T10)/F | 0.13 |
| TTL/F | 7.63 |
| ALT/Gaa | 2.52 |
| R1/F | 3.31 |
| R2/F | 0.64 |
| R3/F | 5.14 |
| R4/F | −3.74 |
| R5/F | 2.68 |
| R6/F | −0.90 |
| R7/F | −1.26 |
| R8/F | 2.26 |
| R9/F | 2.86 |
| R10/F | −1.20 |
| F/F1 | −0.62 |
| F/F2 | 0.28 |
| F/F3 | 0.73 |
| F/F4 | −0.83 |
| F/F5 | 0.56 |

Figure 1B:
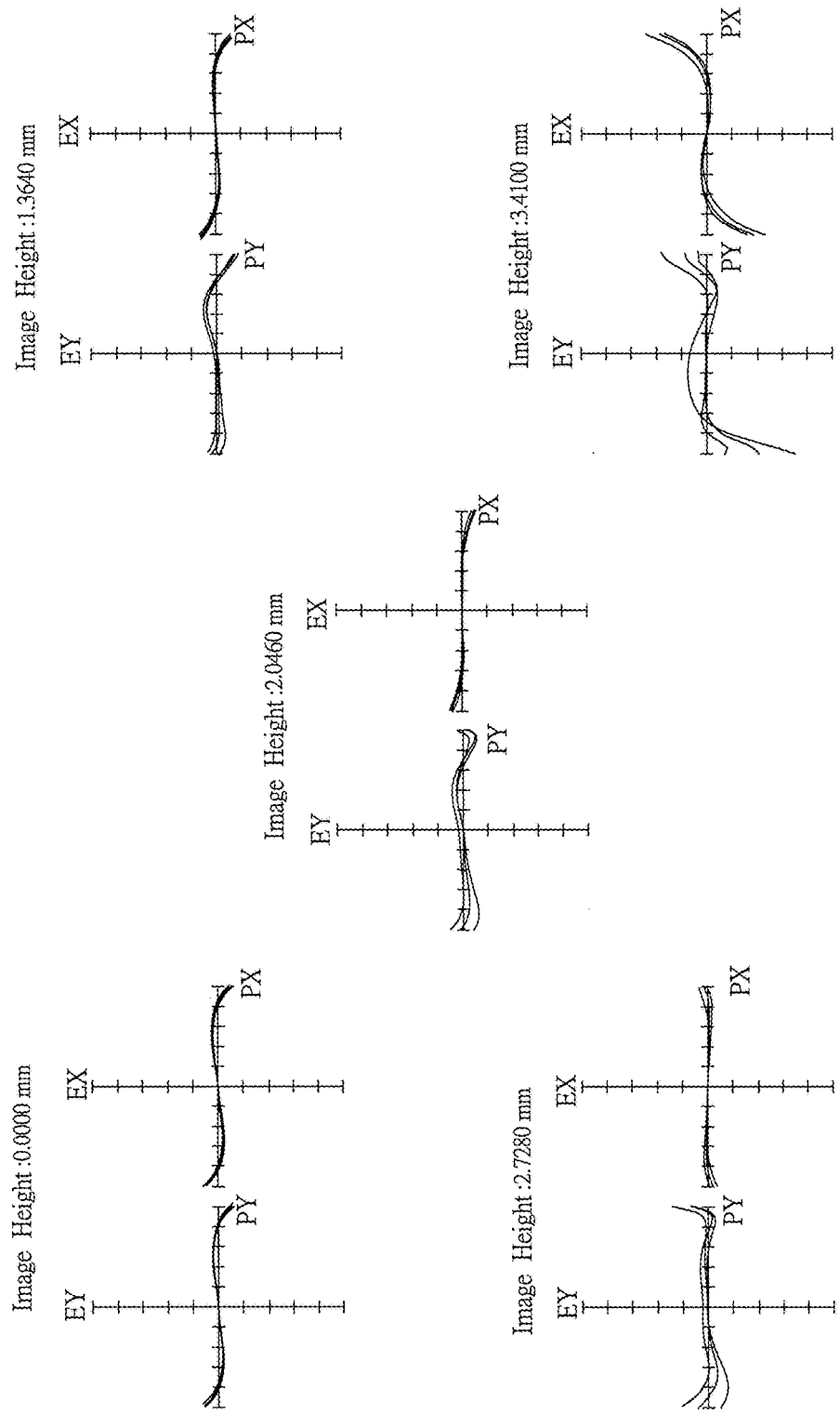
FIG. 1B is a diagram showing the lateral color aberration, at different image heights, of the lens module in accordance with the first embodiment of the present invention.

As a result, the lens module can have the properties of wide-angle, low distortion, high photosensitivity efficiency and high imaging quality. The test result of the field curvature and the distortion of the present embodiment is shown in FIG. 1A, in which the maximum field curvature is within ±0.06 mm, and the maximum distortion is within ±4.5%. The test result of the lateral color aberration, at different image heights, of the present embodiment is shown in FIG. 1B, which shows that adequate chromatic aberration performance can be acquired at different image heights.

Figure 2:
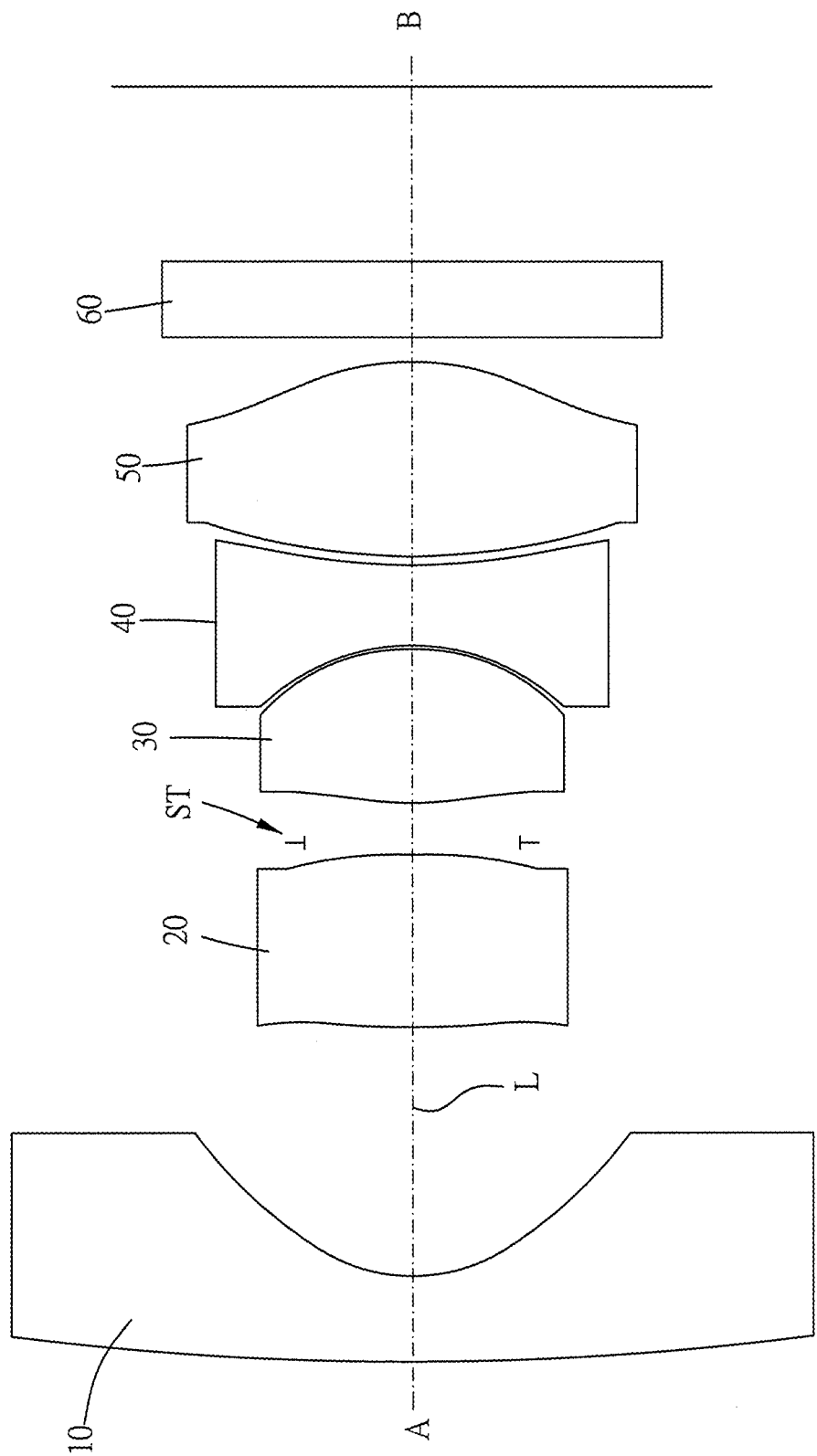
FIG. 2 is a schematic view of a lens module in accordance with the second embodiment of the present invention.

Please refer to FIG. 2 for a lens module in accordance with the second embodiment of the present invention. The structural arrangement of the second embodiment is similar to that of the first embodiment, and the optical feature data thereof are listed in Table 4:

TABLE 4

| Lens | Surface | Radius (mm) | Thickness (mm) | Nd | Vd |
|---|---|---|---|---|---|
| First lens | Object surface 1 | 31.543 | 1.04 | 1.5346 | 56.07 |
|  | Image surface 2 | 1.647 | 3.025 |  |  |
| Second lens | Object surface 3 | 8.983 | 2.086 | 1.64 | 23.53 |
|  | Image surface 4 | −8.944 | 0.125 |  |  |
| Stop |  | ∞ | 0.522 |  |  |
| Third lens | Object surface 6 | 4.461 | 1.866 | 1.5346 | 56.07 |
|  | Image surface 7 | −2.041 | 0.024 |  |  |
| Fourth lens | Object surface 8 | −2.208 | 1.014 | 1.64 | 23.53 |
|  | Image surface 9 | 5.528 | 0.08 |  |  |
| Fifth lens | Object surface 10 | 5.753 | 2.4 | 1.5346 | 56.07 |
|  | Image surface 11 | −2.451 | 0.287 |  |  |
| Plate glass | Object surface 12 | ∞ | 0.9 |  |  |
|  | Image surface 13 | ∞ | 2.23 |  |  |

All the object-sided surfaces and the image-sided surfaces of the first lens 10, the second lens 20, the third lens 30, the fourth lens 40 and the fifth lens 50 are aspheric, whose shapes satisfy the above-mentioned aspheric formula. The coefficients of the aspheric surface in the present embodiment are listed in Table 5:

TABLE 5

|  | Object surface 1 | Image surface 2 | Object surface 3 | Image surface 4 | Object surface 6 |
|---|---|---|---|---|---|
| k | −6.7935E+01 | −8.8800E−01 | −1.6852E+02 | 3.1099E+01 | −1.4926E+01 |
| B | 0 | −8.2000E−04 | 7.6600E−03 | −2.1850E−02 | −2.6900E−03 |
| C | 1.2500E−06 | 2.9400E−04 | −8.3500E−03 | 3.2900E−04 | −1.1630E−03 |
| D | 2.6000E−07 | −5.3640E−05 | 6.3400E−04 | 2.0660E−03 | −2.0700E−03 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |

|  | Image surface 7 | Object surface 8 | Image surface 9 | Object surface 10 | Image surface 11 |
|---|---|---|---|---|---|
| k | −3.0000E−02 | −6.5000E−02 | −5.5200E−01 | −6.5550 | −3.7200E−01 |
| B | 1.5300E−03 | −1.8885E−02 | −7.8600E−03 | 4.3558E−03 | 1.3100E−02 |
| C | −4.5800E−03 | 2.4975E−03 | 2.0293E−03 | 2.4800E−04 | 4.8560E−04 |
| D | 1.3530E−03 | 6.6297E−04 | −3.7300E−03 | −1.1600E−04 | 1.2590E−04 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |

Based on the afore-mentioned design, the total focal length F of the present embodiment is 2.111 mm, the total length thereof is 15.6 mm, the focal length of the first lens is −3.28 mm, the focal length of the second lens is 7.285 mm, the focal length of the third lens is 2.902 mm, the focal length of the fourth lens is −2.328 mm, the focal length of the fifth lens is 3.569 mm, the maximum viewing angle is 110 degrees.

As such, the value of the above-mentioned relationships of the lens module are listed in Table 6:

TABLE 6

| Relationship | Value |
|---|---|
| R1/R10 | −12.87 |
| (T5 + T7 + T9)/(T6 + T8 + T10) | 13.50 |
| \|(R5/R6) + (R7/R8) + (R9/R10)\| | 7.04 |
| (T1 + T3)/F | 1.48 |
| (T2 + T4)/F | 1.74 |
| (T1 + T3)/(T2 + T4) | 0.85 |
| (T5 + T7 + T9)/F | 2.50 |
| (T6 + T8 + T10)/F | 0.19 |
| TTL/F | 7.39 |
| ALT/Gaa | 2.58 |
| R1/F | 14.94 |
| R2/F | 0.78 |
| R3/F | 4.26 |
| R4/F | −4.24 |
| R5/F | 2.11 |
| R6/F | −0.97 |
| R7/F | −1.05 |
| R8/F | 2.62 |
| R9/F | 2.73 |
| R10/F | −1.16 |
| F/F1 | −0.64 |
| F/F2 | 0.29 |
| F/F3 | 0.73 |
| F/F4 | −0.91 |
| F/F5 | 0.59 |

Figure 2B:
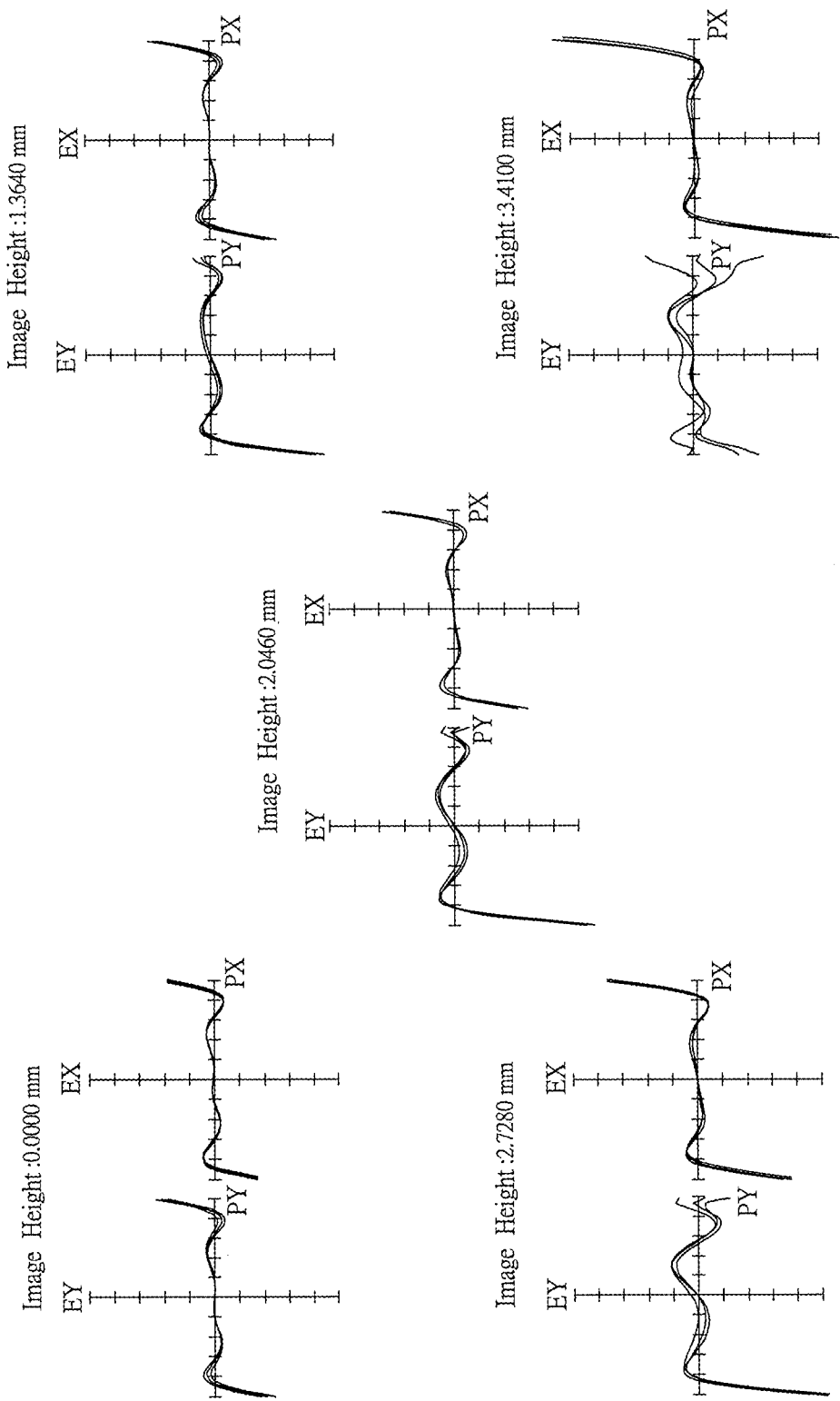
FIG. 2B is a diagram showing the lateral color aberration, at different image heights, of the lens module in accordance with the second embodiment of the present invention.

As a result, the lens module can have the properties of wide-angle, low distortion, high photosensitivity efficiency and high imaging quality. The test result of the field curvature and the distortion of the present embodiment is shown in FIG. 2A, in which the maximum field curvature does not exceed 0.16 mm, and the maximum distortion is within ±6%. The test result of the lateral color aberration, at different image heights, of the present embodiment is shown in FIG. 2B, which shows that adequate chromatic aberration performance can be acquired at different image heights.

Figure 3:
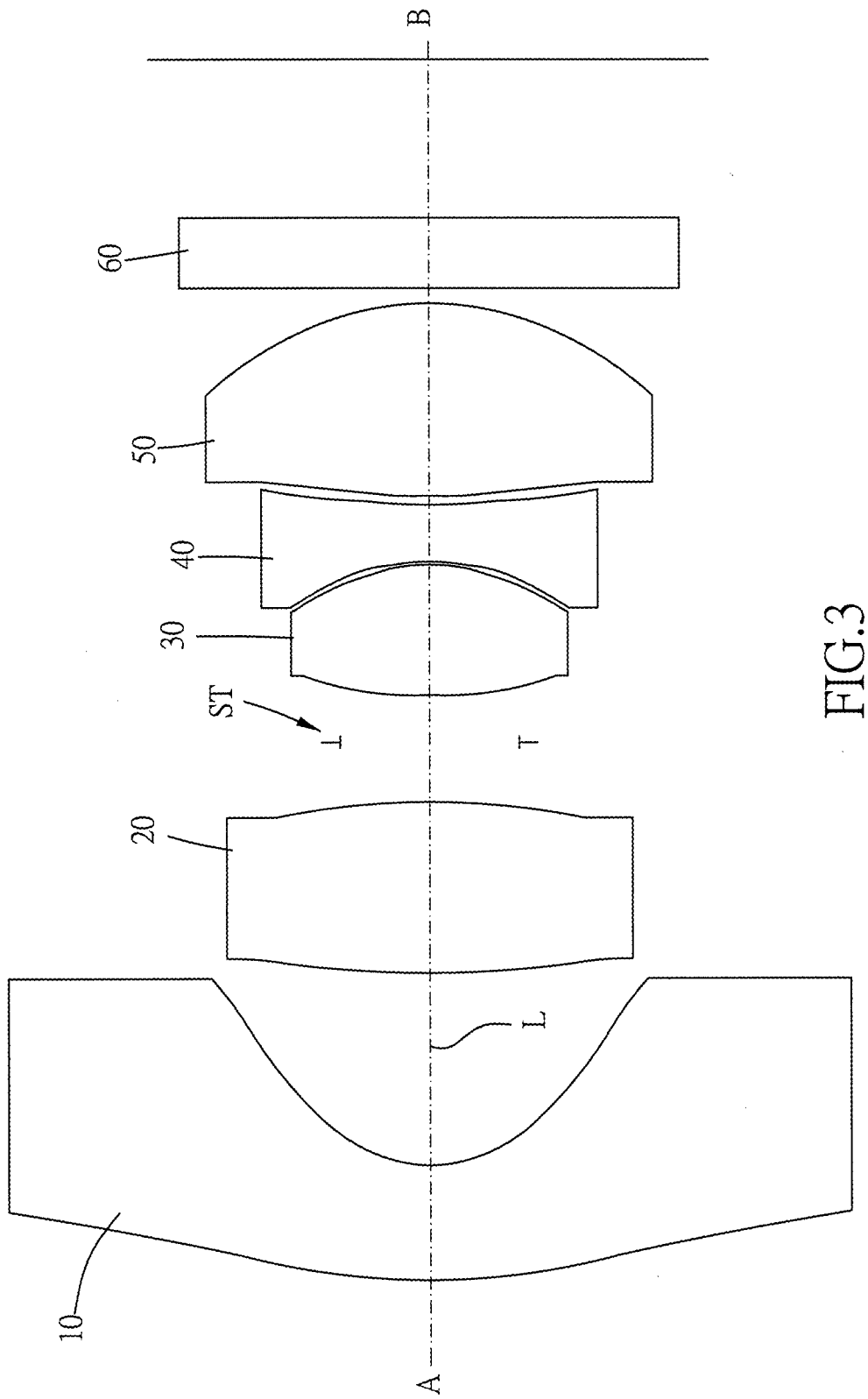
FIG. 3 is a schematic view of a lens module in accordance with the third embodiment of the present invention.

Please refer to FIG. 3 for a lens module in accordance with the third embodiment of the present invention. The structural arrangement of the third embodiment is similar to that of the first embodiment, and the optical feature data thereof are listed in Table 7:

TABLE 7

| Lens | Surface | Radius (mm) | Thickness (mm) | Nd | Vd |
|---|---|---|---|---|---|
| First lens | Object surface 1 | 5.746 | 1.444 | 1.5346 | 56.07 |
|  | Image surface 2 | 1.228 | 2.464 |  |  |
| Second lens | Object surface 3 | 10.761 | 2.141 | 1.64 | 23.53 |
|  | Image surface 4 | −7.888 | 0.776 |  |  |
| Stop |  | ∞ | 0.607 |  |  |
| Third lens | Object surface 6 | 5.296 | 1.65 | 1.5346 | 56.07 |
|  | Image surface 7 | −1.851 | 0.023 |  |  |
| Fourth lens | Object surface 8 | −2.587 | 0.753 | 1.64 | 23.53 |
|  | Image surface 9 | 5.696 | 0.105 |  |  |
| Fifth lens | Object surface 10 | 6.229 | 2.493 | 1.5346 | 56.07 |
|  | Image surface 11 | −2.456 | 0.162 |  |  |
| Plate glass | Object surface 12 | ∞ | 0.9 |  |  |
|  | Image surface 13 | ∞ | 2.083 |  |  |

All the object-sided surfaces and the image-sided surfaces of the first lens 10, the second lens 20, the third lens 30, the fourth lens 40 and the fifth lens 50 are aspheric, whose shapes satisfy the above-mentioned aspheric formula. The coefficients of the aspheric surface in the present embodiment are listed in Table 8:

TABLE 8

|  | Object surface 1 | Image surface 2 | Object surface 3 | Image surface 4 | Object surface 6 |
|---|---|---|---|---|---|
| k | −9.3740 | −8.7800E−01 | −3.6090 | 1.5790E+01 | −2.8660E+01 |
| B | −1.2483E−04 | −1.8037E−03 | 7.9116E−04 | 5.5808E−03 | 3.0832E−02 |
| C | −2.4360E−05 | 1.1406E−03 | −6.2614E−04 | 4.0758E−04 | −1.7091E−03 |
| D | −1.7405E−07 | −2.7530E−04 | 8.9940E−05 | 9.1856E−04 | −9.2011E−04 |
| E | 3.9727E−08 | −1.1982E−06 | −2.8530E−06 | −4.2702E−04 | −7.3043E−04 |
| F | −6.5812E−10 | −5.4869E−06 | −3.2599E−06 | 7.9316E−05 | 1.7375E−04 |
| G | 0 | 0 | 0 | 0 | 4.3869E−04 |
| H | 0 | 0 | 0 | 0 | −1.4784E−04 |
|  | Image surface 7 | Object surface 8 | Image surface 9 | Object surface 10 | Image surface 11 |
| k | −4.3800E−01 | 1.8200E−01 | −1.8810E+01 | −2.9406E+01 | −2.2800E−01 |
| B | 1.7430E−02 | −2.4326E−02 | −1.4036E−02 | −1.0275E−03 | 8.8877E−03 |
| C | −2.6952E−03 | 3.4747E−04 | 2.5066E−03 | −5.6985E−04 | 4.4544E−04 |
| D | 7.7924E−04 | 2.3893E−04 | 2.8989E−05 | −8.1784E−05 | 1.0138E−04 |
| E | −2.1120E−04 | −2.3579E−05 | 1.0781E−05 | 2.9814E−05 | −5.8440E−06 |
| F | −1.0591E−04 | 1.5288E−04 | 4.9225E−06 | 3.1249E−06 | −9.0912E−07 |
| G | 4.9503E−05 | 5.5011E−05 | 2.1828E−06 | 9.2369E−08 | 5.5706E−08 |
| H | 5.5896E−05 | 1.9137E−05 | −5.9371E−07 | −4.8971E−07 | −4.1747E−09 |

Based on the afore-mentioned design, the total focal length F of the present embodiment is 2.03 mm, the total length thereof is 15.6 mm, the focal length of the first lens is −3.276 mm, the focal length of the second lens is 7.394 mm, the focal length of the third lens is 2.78 mm, the focal length of the fourth lens is −2.665 mm, the focal length of the fifth lens is 3.648 mm, the maximum viewing angle is 110 degrees.

As such, the value of the above-mentioned relationships of the lens module are listed in Table 9:

TABLE 9

| Relationship | Value |
|---|---|
| R1/R10 | −2.34 |
| (T5 + T7 + T9)/(T6 + T8 + T10) | 16.88 |

TABLE 9-continued

| Relationship | Value |
|---|---|
| \|(R5/R6) + (R7/R8) + (R9/R10)\| | 7.60 |
| (T1 + T3)/F | 1.77 |
| (T2 + T4)/F | 1.90 |
| (T1 + T3)/(T2 + T4) | 0.93 |
| (T5 + T7 + T9)/F | 2.41 |
| (T6 + T8 + T10)/F | 0.14 |
| TTL/F | 7.69 |
| ALT/Gaa | 2.52 |
| R1/F | 2.83 |
| R2/F | 0.60 |
| R3/F | 5.30 |
| R4/F | −3.89 |
| R5/F | 2.61 |
| R6/F | −0.91 |
| R7/F | −1.27 |
| R8/F | 2.81 |
| R9/F | 3.07 |
| R10/F | −1.21 |
| F/F1 | −0.62 |
| F/F2 | 0.27 |
| F/F3 | 0.73 |
| F/F4 | −0.76 |
| F/F5 | 0.56 |

Figure 3A:
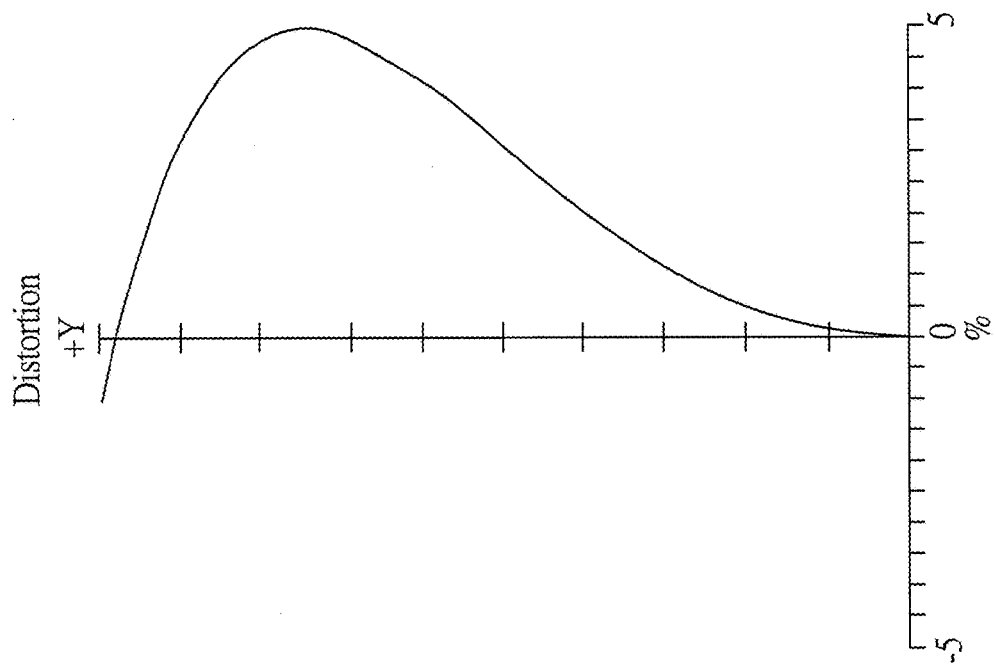
FIG. 3A a diagram showing the field curvature and the distortion of the lens module in accordance with the third embodiment of the present invention.
Figure 3A:
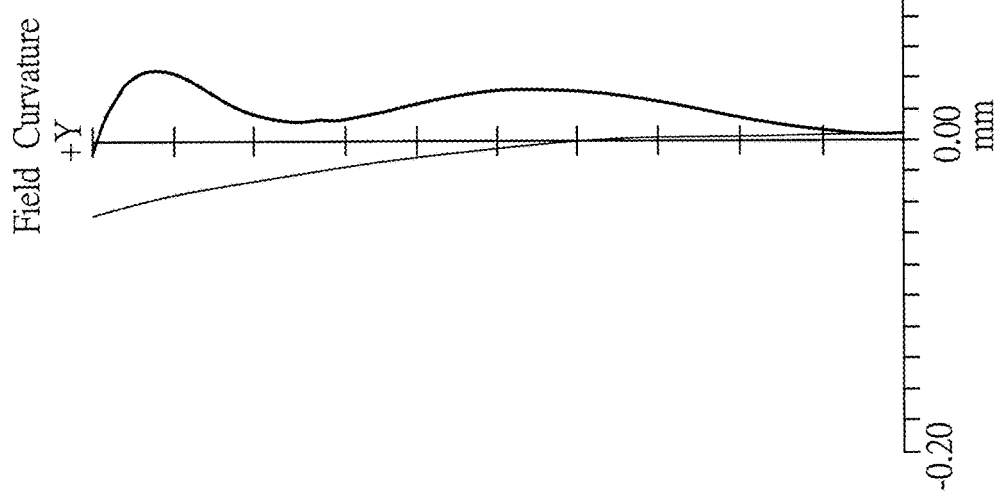
Figure 3B:
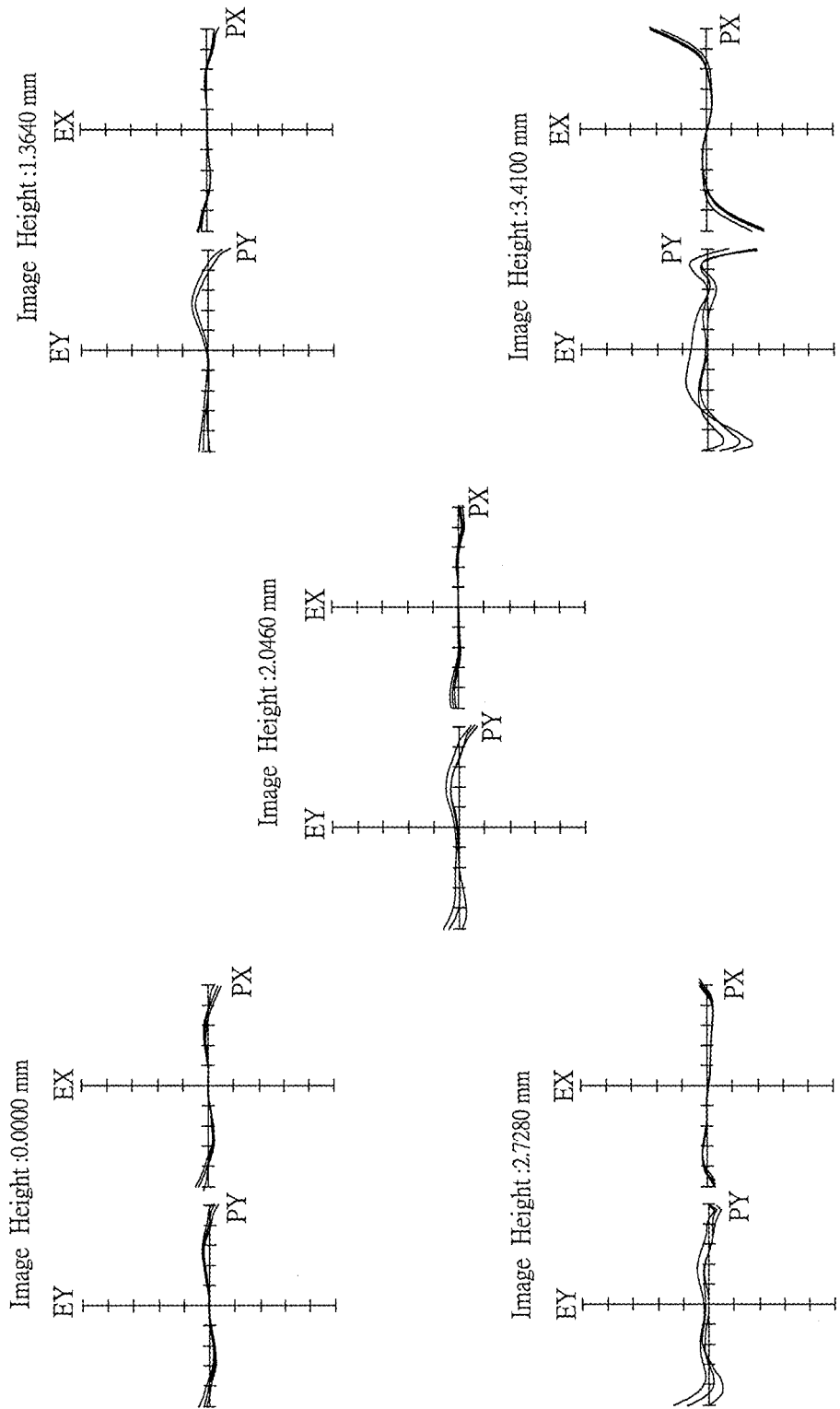
FIG. 3B is a diagram showing the lateral color aberration, at different image heights, of the lens module in accordance with the third embodiment of the present invention.

As a result, the lens module can have the properties of wide-angle, low distortion, high photosensitivity efficiency and high imaging quality. The test result of the field curvature and the distortion of the present embodiment is shown in FIG. 3A, in which the maximum field curvature is within ±0.05 mm, and the maximum distortion is within ±5%. The test result of the lateral color aberration, at different image heights, of the present embodiment is shown in FIG. 3B, which shows that adequate chromatic aberration performance can be acquired at different image heights.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A five-piece wide-angle lens module, comprising in a sequence from an object side to an image side of:
a first lens, having negative refraction power, an object-sided surface and an image-sided surface, a radius of curvature of the object-sided surface of the first lens being a positive value, the radius of curvature of the object-sided surface of the first lens being larger than that of the image-sided surface of the first lens;
a second lens, having positive refraction power, an object-sided surface and an image-sided surface, a radius of curvature of the object-sided surface of the second lens being a positive value, the radius of curvature of the object-sided surface of the second lens being larger than that of the image-sided surface of the second lens;
a third lens, having positive refraction power, an object-sided surface and an image-sided surface, a radius of curvature of the image-sided surface of the third lens being a negative value, a radius of curvature of the object-sided surface of the third lens being larger than that of the image-sided surface of the third lens;
a fourth lens, having negative refraction power, an object-sided surface and an image-sided surface, a radius of curvature of the image-sided surface of the fourth lens being a positive value, a radius of curvature of the object-sided surface of the fourth lens being smaller than that of the image-sided surface of the fourth lens; and
a fifth lens, having positive refraction power, an object-sided surface and an image-sided surface, a radius of curvature of the image-sided surface of the fifth lens being a negative value, a radius of curvature of the object-sided surface of the fifth lens being larger than that of the image-sided surface of the fifth lens;
wherein the five-piece wide-angle lens module further satisfies the following relationship:
$30 \geq (T5+T7+T9)/(T6+T8+T10) \geq 10$; wherein T5 refers to a thickness of the third lens on an optical axis of the five-piece wide-angle lens module, T7 refers to a thickness of the fourth lens on the optical axis, T9 refers to a thickness of the fifth lens on the optical axis, T6 refers to a distance between the third lens and the fourth lens on the optical axis, T8 refers to a distance between the fourth lens and the fifth lens on the optical axis, T10 refers to a distance between the fifth lens and an element behind the fifth lens on the optical axis.

2. The five-piece wide-angle lens module of claim 1, further satisfying the following relationship:
$0 > R1/R10 \geq -15$; wherein R1 refers to a radius of curvature of the object-sided surface of the first lens, R10 refers to a radius of curvature of the image-sided surface of the fifth lens.

3. The five-piece wide-angle lens module of claim 1, further satisfying the following relationship:
$8 \geq |(R5/R6)+(R7/R8)+(R9/R10)| \geq 7$; wherein R5 refers to a radius of curvature of the object-sided surface of the third lens, R6 refers to a radius of curvature of the image-sided surface of the third lens, R7 refers to a radius of curvature of the object-sided surface of the fourth lens, R8 refers to a radius of curvature of the image-sided surface of the fourth lens, R9 refers to a radius of curvature of the object-sided surface of the fifth lens, R10 refers to a radius of curvature of the image-sided surface of the fifth lens.

4. The five-piece wide-angle lens module of claim 1, further satisfying the following relationship:
$1 < (T1+T3)/F < 2.5$; wherein T1 refers to a thickness of the first lens on the optical axis, T3 refers to a thickness of the second lens on the optical axis, F refers to a focal length of the five-piece wide-angle lens module.

5. The five-piece wide-angle lens module of claim 1, further satisfying the following relationship:
$2.2 < (T5+T7+T9)/F < 5$; wherein F refers to a focal length of the five-piece wide-angle lens module.

6. The five-piece wide-angle lens module of claim 1, further satisfying the following relationship:
$0 < (T6+T8+T10)/F < 0.25$; wherein F refers to a focal length of the five-piece wide-angle lens module.

7. The five-piece wide-angle lens module of claim 1, further comprising a stop located between the second lens and the third lens.

8. The five-piece wide-angle lens module of claim 1, further satisfying the following relationship:
$1.5 < (T2+T4)/F < 2.5$; wherein T2 refers to a distance between the first lens and the second lens on the optical axis, T4 refers to a distance between the second lens and the third lens on the optical axis, F refers to a focal length of the five-piece wide-angle lens module.

9. The five-piece wide-angle lens module of claim 1, further satisfying the following relationship:
$0.83 < (T1+T3)/(T2+T4) < 1.5$; wherein T1 refers to a thickness of the first lens on the optical axis, T3 refers to a thickness of the second lens on the optical axis, T2 refers to a distance between the first lens and the second lens on the optical axis, T4 refers to a distance between the second lens and the third lens on the optical axis.

10. The five-piece wide-angle lens module of claim 1, wherein the image-sided surface of the first lens is concave.

11. The five-piece wide-angle lens module of claim 1, wherein the image-sided surface of the second lens is convex.

12. The five-piece wide-angle lens module of claim 1, wherein the object-sided surface of the third lens is convex.

13. The five-piece wide-angle lens module of claim 1, wherein the object-sided surface of the fourth lens is concave.

14. The five-piece wide-angle lens module of claim 1, wherein the object-sided surface of the fifth lens is convex.

* * * * *